US006731204B2

(12) United States Patent
Lehmann

(10) Patent No.: US 6,731,204 B2
(45) Date of Patent: May 4, 2004

(54) OBJECT DETECTION SYSTEM PROVIDING DRIVER INFORMATION THROUGH SOUND

(75) Inventor: Kurt S. Lehmann, Clarkston, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 9 days.

(21) Appl. No.: 10/078,680

(22) Filed: Feb. 19, 2002

(65) Prior Publication Data

US 2003/0156019 A1 Aug. 21, 2003

(51) Int. Cl.[7] .......................... B60Q 1/00; B60R 25/10; G08G 1/00; G01S 15/00; G06F 17/10
(52) U.S. Cl. .................... 340/435; 340/426.1; 340/903; 340/904; 340/942; 367/93; 367/95; 367/99; 701/300; 701/301
(58) Field of Search ............................. 340/426.1, 435, 340/436, 903, 904, 942; 367/93, 95, 99, 107–116; 701/300, 301

(56) References Cited

U.S. PATENT DOCUMENTS

| | | | | |
|---|---|---|---|---|
| 4,528,563 A | * | 7/1985 | Takeuchi | 340/903 |
| 4,565,991 A | | 1/1986 | Lupoli et al. | |
| 4,612,530 A | | 9/1986 | Kurth et al. | |
| 5,410,346 A | | 4/1995 | Saneyoshi et al. | |
| 5,574,426 A | * | 11/1996 | Shisgal et al. | 340/435 |
| 5,650,765 A | * | 7/1997 | Park | 340/436 |
| 5,963,148 A | | 10/1999 | Sekine et al. | |
| 6,097,285 A | * | 8/2000 | Curtin | 340/436 |
| 6,281,806 B1 | | 8/2001 | Smith et al. | |

* cited by examiner

Primary Examiner—Jeffery Hofsass
Assistant Examiner—Lam Pham
(74) Attorney, Agent, or Firm—Brinks Hofer Gilson & Lione

(57) ABSTRACT

A vehicle object detection system is disclosed that audibly conveys to the vehicle operator the direction of the detected object relative to the vehicle through the vehicle's audio system. The system includes a sensor array, a processor, and a speaker arrangement. The sensor array detects an object remote from the vehicle and generates a signal when an object has been detected. The processor receives and processes the sensor array signal. Then, the processor transmits the processed signal to the speaker arrangement. The speaker arrangement audibly conveys the processed signal over multiple audio channels. The method of detecting an object remote from the vehicle is also disclosed. The method involves detecting an object remote from the vehicle, determining information relating to the object, determining whether the information relating to the object meets certain criteria and, if certain criteria are met, transmitting sound over multiple audio channels to audibly convey object information through the vehicle's audio system, and modulating the sound outputted to give the driver directional cues for the position of the object.

20 Claims, 2 Drawing Sheets

OBJECT DETECTION SYSTEM PROVIDING DRIVER INFORMATION THROUGH SOUND

FIELD OF THE INVENTION

The present invention relates generally to an object detection system used in a vehicle and, more specifically, to an audibly conveyed object detection system used in a vehicle.

BACKGROUND OF THE INVENTION

Object detection devices that are used in association with vehicles are well known. These systems are designed to aid the driver of the vehicle by obtaining information on the environment surrounding the vehicle. Some known systems include back-up sensor systems and object illumination systems.

One type of back-up sensor system currently employed in vehicles involves detecting an object in the path of a rearward-moving vehicle. In this scenario, as the vehicle backs up sensors positioned on the rear side of the vehicle will detect an object in the vehicle's path. These systems typically have a speaker separate from the vehicle's radio system from which a beeping sound is transmitted if an object is detected in the vehicle's path.

In many of these back-up sensor systems, the frequency of the beeping sound varies depending on the distance of the detected object from the vehicle. There are typically three frequency ranges. The first frequency is the fastest, the third frequency is the slowest, and the second frequency is intermediate between the first and third frequencies. Further, there are typically three distance ranges associated with the varying frequencies of the beeping sound.

For example, if the object is positioned within the first distance range a first frequency beeping sound will be transmitted via the speaker. If the object is positioned within the second distance range, a second frequency beeping sound will be transmitted via the speaker. If the object is positioned within the third distance range, a third frequency beeping sound will be transmitted via the speaker.

A disadvantage of this system is that only objects that are directly in the path of the rearward-moving vehicle are detected. Further, another disadvantage is that the system is limited to detecting objects behind the vehicle.

Another type of object detection system is disclosed in U.S. Pat. No. 6,281,806. More specifically, this system is an object illumination system. The invention involves detecting an object remote from a vehicle and using a controlled light source to continuously illuminate the object. The light source is adapted to continuously illuminate the detected object including simultaneous motion of the vehicle and object with respect to one another. A disadvantage of this system is that it may not aid a visually impaired driver in detecting the presence of an object remote from the vehicle. Another disadvantage of this type of system is that the driver's attention is directed away from the road.

Thus, there is a need in the vehicle situational awareness systems field to create an improved, new and useful audibly conveyed vehicle situational awareness system. Specifically, there is a need for an object detection system that will overcome the disadvantages outlined in association with known object detection systems. This invention provides such an improved, new and useful vehicle situational awareness system.

BRIEF SUMMARY OF THE INVENTION

The present invention relates to an object detection system for use in a vehicle that audibly conveys, via multiple channel sound, information about a detected object to the driver. The system includes a sensor array, a processor, and a speaker arrangement.

The sensor array detects an object remote from the vehicle over a large angular range around the vehicle. Further, the sensor array generates a signal when an object has been detected.

The processor performs several functions. The processor receives the sensor array signal, processes the signal, and transmits a processed sensor array signal.

The speaker arrangement is disposed inside of the vehicle and is driven by the processor. Specifically, the speaker arrangement receives the processed signal transmitted from the processor. Upon receipt of a processed signal identifying an object and its features, the speaker arrangement transmits multiple channel sound to audibly convey the information received. The processor modulates the sound produced by the speakers to add a spatial dimension to the information in which the sound is interpreted by the driver as emanating from the same direction as the object location relative to the vehicle.

A method of detecting an object remote from a vehicle is also disclosed. The method includes the steps of: A) detecting an object remote from a vehicle; B) determining information relating to the object; C) determining whether the information relating to the object meets certain criteria; if certain criteria are met, D) transmitting sound over multiple audio channels to audibly convey the object information through an audio system in the vehicle; and E) modulating the sound outputted to give the driver directional cues for the position of the object.

One advantage of the present invention is that it audibly conveys, via multiple channel sound, information regarding a detected object to the driver of the vehicle that includes the direction of the object relative to the vehicle. Therefore, the driver can continue to focus on the road with heightened awareness. Another advantage of the present invention is that the sensors are positioned around the vehicle such that an object positioned at any point around the periphery of the vehicle can be detected. Further, a maximum amount of information relating to the object can be detected. Another advantage is that, preferably, the speaker arrangement is part of the vehicle's audio system.

DETAILED DESCRIPTION OF THE INVENTION

The following description of the preferred embodiment of the invention is not intended to limit the invention to this preferred embodiment, but rather to enable a person skilled in the art of object detection systems to make and use this invention.

Figure 1:
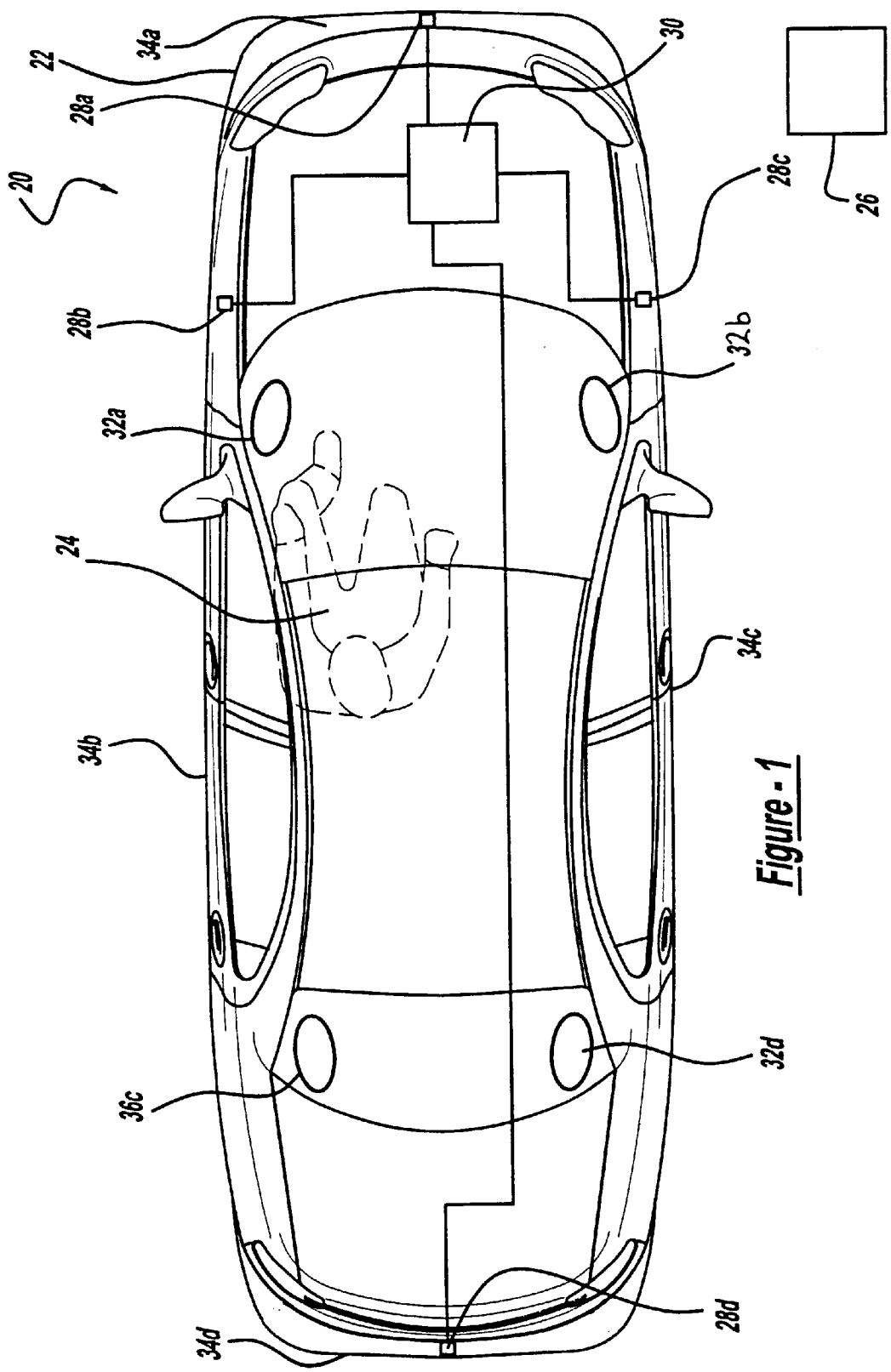
FIG. 1 is a top view of a preferred embodiment of the invention.

As shown in FIG. 1, the disclosed object detection system, shown generally at 20, is used in a vehicle 22 to audibly notify a human operator 24 of the vehicle 22 that an object 26 remote from the vehicle 22 has been detected. The preferred embodiment of the object detection system 20 for use in a vehicle 22 includes a sensor array 28 disposed on the outside of the vehicle 22, a processor 30, and a speaker arrangement 32 disposed on the inside of the vehicle 22. The sensor array 28 detects an object 26 remote from the vehicle 22 and generates a signal upon detecting the object 26. The processor 30 receives the sensor array signal, processes the signal and, transmits the processed signal to the speaker arrangement 32. The speaker arrangement 32 receives the processed signal from the processor 30 and audibly transmits via multiple channel sound the processed signal.

Preferably, the sensor array 28 includes at least four sensors 28(*a*), 28(*b*), 28(*c*), 28(*d*). Further, the vehicle 22 will typically have four sides, a front side 34(*a*), a left side 34(*b*), a right side 34(*c*), and a rear side 34(*d*). At least one sensor 28 will be positioned on each of the four sides 34 of the vehicle 22. For example, a first sensor 28(*a*) will be on the front side 34(*a*) of the vehicle 22, a second sensor 28(*b*) will be on the left side 34 (*b*) of the vehicle 22, a third sensor 28(*c*) will be on the right side 34(*c*) of the vehicle 22, and a fourth sensor 28(*d*) will be on the rear side 34(*d*) of the vehicle 22. Although the use of four sensors is disclosed, it is understood that any number of sensors can be used and numerous sensor configurations can be used and fall within the scope of the present invention.

Further, different types of sensors can be used in the sensor array 28, including but not limited to, acoustical ultrasonic sensor, radar sensors, and infrared sensors. The sensors 28 detect a variety of information relating to the object 26 including the direction of the object 26 relative to the vehicle 22. The sensors 28 may also be able to detect the distance of the object 26 relative to the vehicle 22 and/or the size of the object 26.

The sensor array signal includes all of the information from each sensor 28. The sensor array signal is sent to the processor 30 for processing. Once the processor 30 receives the sensor array signal all of the information is processed to determine various features of the detected object 26 including its direction relative to the vehicle.

Preferably, the vehicle 22 has a vehicle audio system. The speaker arrangement 32 is preferably part of the vehicle's audio system. Further, the audio system has at least two, but preferably, four speakers 32(*a*), 32(*b*), 32(*c*), 32(*d*). The speakers 32 are used to audibly convey the direction of the object 26 relative to the vehicle 22. As the vehicle 22 passes the object 26, the speaker 32 transmitting the sound varies such that the sound will be transmitted primarily through the speaker 32 closest to the object 26. In other words, the speaker arrangement includes speakers that are distributed around the driver, and through audio "imaging", the directional component to the sound is provided.

The speaker arrangement 32 transmits a sound that varies depending on the distance of the object 26 relative to the vehicle 22. Preferably, the frequency of the sound transmitted through the speaker arrangement 32 varies depending on the distance of the object 26 from the vehicle 22. In the preferred embodiment, when an object 26 has been detected, the sound transmitted through the speaker arrangement 32 is a beeping sound. Therefore, the closer the object 26 is to the vehicle 22, the more beeps per time period will be transmitted through the speaker arrangement 32.

The speaker arrangement 32 also transmits a sound that varies depending on the size of the object 26. Preferably, the tone of the sound transmitted through the speaker arrangement 32 varies depending on the size of the object 26. In the preferred embodiment, as the size of the detected object 26 increases the tone of the sound transmitted through the speaker arrangement 32 will be lower. In other words, a lower toned sound will be transmitted for larger objects and a higher-toned sound will be transmitted for smaller objects.

Figure 2:
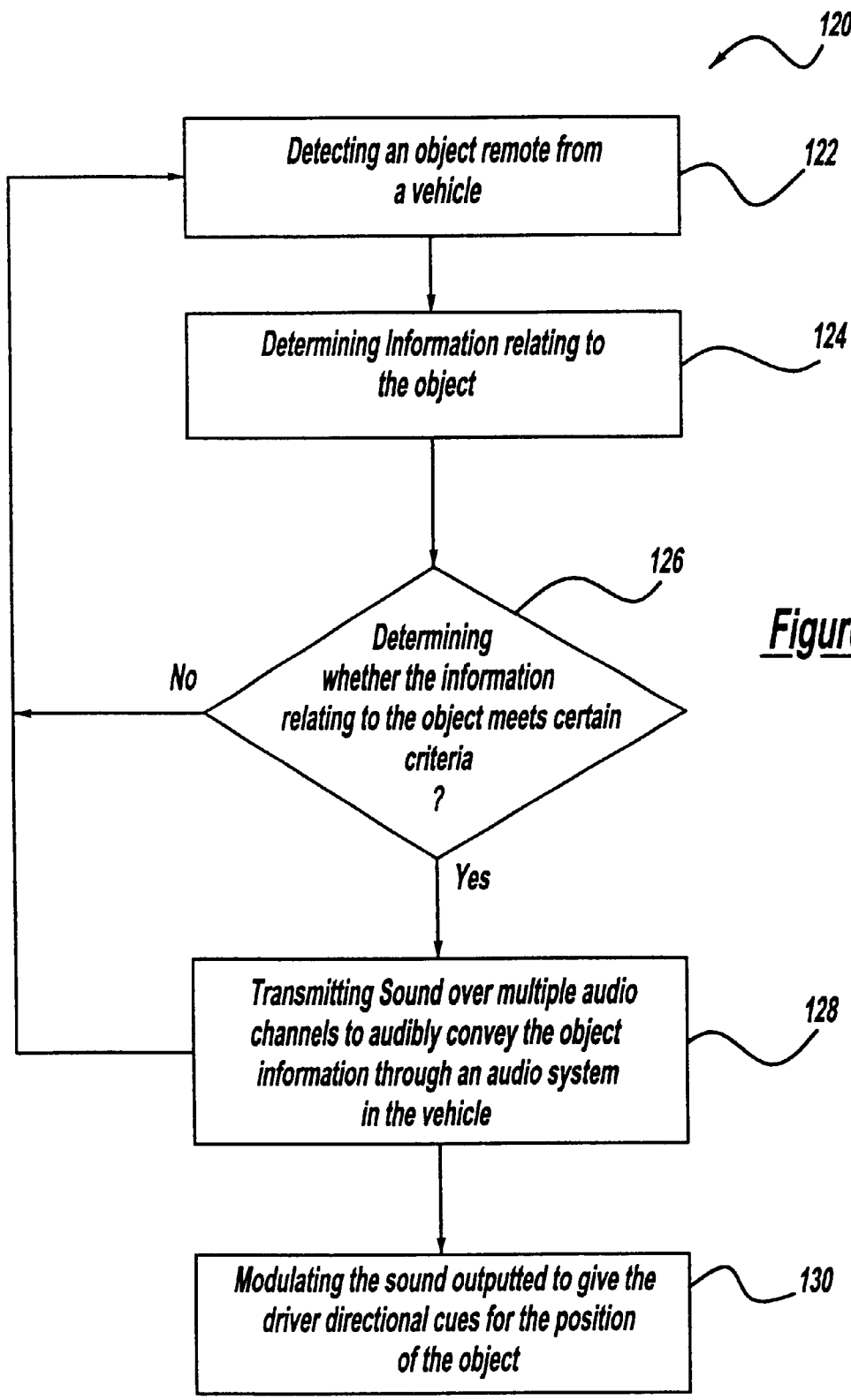
FIG. 2 is a flowchart representation of a preferred embodiment of the invention.

FIG. 2 illustrates the method of detecting an object remote from a vehicle. The method, shown generally at 120, includes the following steps. An object remote from the vehicle is detected, as shown at 122. At 124, information relating to the object is determined. A determination is made as to whether the information relating to the object meets certain criteria, at 126. If certain criteria are not met, the system continues to detect objects remote from the vehicle. If certain criteria are met, the system goes on to audibly transmit detected object information via multiple channel sound through the vehicle's audio system, as shown at 128. At 130, the sound outputted is modulated to give the driver directional cues for the position of the object. The detected object information may also include the distance of the object relative to the vehicle and/or the size of the object.

The present object detection system can be used as either a driver aid or a safety device. As a driver aid, if the vehicle's audio system is on and an object is detected the warning sound will not override the audio system. In other words, the vehicle's audio system will continue to function and the warning sound will also be transmitted. As a safety device, if the vehicle's audio system is on and an object is detected the warning sound will override the audio system. In other words, the audio system will turn off so that the driver will only hear the warning detection sound.

Further, the present object detection system can be used in association with other vehicle safety features. For instance, an anti-lock braking system might be activated by this system.

As a person skilled in the art of object detection systems will recognize from the previous detailed description and from the figures and claims, modifications and changes can be made to the preferred embodiment of the invention without departing from the scope of this invention as defined in the following claims.

What is claimed is:

1. An object detection system for use in a vehicle comprising:
    a sensor array for detecting an object remote from the vehicle and sensing a direction of the object with respect to the vehicle, said sensor array generating a signal upon detecting the object;
    a speaker arrangement disposed inside the vehicle wherein said speaker arrangement transmits a sound that varies depending on the size of the object; and
    a processor for receiving said sensor array signal and creating a multiple channel driving signal for said speaker arrangement which is modulated by the direction of the object and outputted by said speaker arrangement which provides audible cues through audio imaging for a driver of the vehicle as to the direction of the object.

2. The object detection system according to claim 1 wherein the vehicle has a vehicle audio system and said speaker arrangement is part of the vehicle audio system.

3. The object detection system according to claim 2 wherein said speaker arrangement comprises at least four speakers.

4. The object detection system according to claim 3 wherein said speaker arrangement primarily transmits sound from one of said at least four speakers that is positioned closest to the object.

5. The object detection system according to claim 4 wherein as the vehicle passes the object said speaker transmitting the sound varies such that the sound is primarily transmitted through said speaker closest to the object.

6. The object detection system according to claim 1 wherein said sensor array is disposed outside the vehicle and comprises at least four sensors, the vehicle having a front side including at least one of said at least four sensors, a left side including at least one of said at least four sensors, a right side including at least one of said at least four sensors, and a rear side including at least one of said at least four sensors.

7. The object detection system according to claim 1 wherein said sensor arrangement detects the distance of the object from the vehicle.

8. The object detection system according to claim 7 wherein said speaker arrangement transmits a sound that varies depending on the distance of the object from the vehicle.

9. The object detection system according to claim 8 wherein a frequency of the sound transmitted through said speaker arrangement varies depending on the distance of the object from the vehicle.

10. The object detection system according to claim 1 wherein said sensor array detects a size of the object.

11. The object detection system according to claim 1 wherein a tone of the sound transmitted through said speaker arrangement varies depending on the size of the object.

12. An object detection system for use in a vehicle to notify a human operator of the vehicle of an object remote from the vehicle, the object detection system comprising:
    a sensor arrangement for detecting an object remote from the vehicle, sensing a direction of the object with respect to the vehicle and generating a signal upon detecting the object;
    a processor for receiving said sensor arrangement signal, processing said sensor arrangement signal and transmitting a multiple channel processed sensor arrangement signal;
    at least two speakers disposed inside the vehicle and physically separated for communicating with said processor to receive said processed sensor arrangement signal and audibly transmitting said processed sensor arrangement signal by transmitting sound that provides audible cues through audio imaging for the human operator as to the direction of the object; and
    wherein said sensor arrangement also senses a size of the object and said at least two speakers transmit sound in a manner that provides audible cues for the human operator as to a size of the object.

13. The object detection system of claim 12 wherein said sensor arrangement also senses a distance of the object relative to the vehicle and said at least two speakers transmit sound in a manner that provides audible cues for the human operator as to the distance of the object relative to the vehicle.

14. A method of detecting an object remote from a vehicle comprising:
    (A) detecting an object remote from a vehicle;
    (B) determining information relating to the object;
    (C) determining whether the information relating to the object meets certain criteria;
    (D) transmitting sound over multiple audio channels to audibly convey the object information through an audio system in the vehicle when certain criteria are met; and
    (E) modulating the sound outputted to give the driver audible cues as to a size of the object and directional cues through audio imaging for the position of the object.

15. The method according to claim 14 wherein the information relating to the object also includes the distance of the object relative to the vehicle.

16. The method according to claim 14 wherein the information relating to the object also includes a size of the object.

17. An object detection system for use in a vehicle comprising:
    a sensor array for detecting an object remote from the vehicle and sensing a direction of said object with respect to the vehicle, said sensor array generating a signal upon detecting said object;
    a speaker arrangement disposed inside the vehicle, wherein said speaker arrangement transmits a sound that varies depending on a size of said object; and
    a processor for receiving said sensor array signal and creating a driving signal for said speaker arrangement which is modulated by said direction of the object and outputted by said speaker arrangement in a manner which provides audible cues for a driver of the vehicle as to said direction of said object.

18. The object detection system according to claim 17 wherein a tone of the sound transmitted through said speaker arrangement varies depending on the size of the object.

19. An object detection system for use in a vehicle to notify a human operator of the vehicle of an object remote from the vehicle, the object detection system comprising:
    a sensor arrangement for detecting an object remote from the vehicle, sensing a direction of the object with respect to the vehicle and generating a signal upon detecting the object;
    a processor for receiving said sensor arrangement signal, processing said sensor arrangement signal and transmitting a processed sensor arrangement signal;
    at least two speakers disposed inside the vehicle and physically separated for communicating with said processor to receive said processed sensor arrangement signal and audibly transmitting said processed sensor arrangement signal by transmitting sound in a manner that provides audible cues for the human operator as to the direction of the object: and
    wherein said sensor arrangement also senses a size of the object and said at least two speakers transmit sound in a manner that provides audible cues for the human operator as to a size of the object.

20. A method of detecting an object remote from a vehicle comprising:
    detecting an object remote from a vehicle;
    determining information relating to the object, wherein said information relating to the object also includes a size of the object;
    determining whether said information relating to the object meets certain criteria;
    transmitting sound over multiple audio channels to audibly convey said information through an audio system in the vehicle when certain criteria are met, where said information audibly conveyed includes the size of the object; and
    modulating said sound outputted to give an operator directional cues for the position of the object.

* * * * *